(12) United States Patent
Hwang et al.

(10) Patent No.: US 10,900,543 B2
(45) Date of Patent: Jan. 26, 2021

(54) HYBRID VEHICLE TRANSMISSION

(71) Applicants: HYUNDAI MOTOR COMPANY, Seoul (KR); KIA MOTORS CORPORATION, Seoul (KR)

(72) Inventors: Dong Hwan Hwang, Seoul (KR); Kyeong Hun Lee, Seoul (KR); Jong Sool Park, Hwaseong-si (KR); Jong Soo Kim, Seoul (KR); Ho Rim Yang, Yongin-si (KR); Wook Jin Jang, Yongin-si (KR); Jin Ho Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/741,336

(22) Filed: Jan. 13, 2020

(65) Prior Publication Data
US 2020/0149613 A1 May 14, 2020

Related U.S. Application Data

(62) Division of application No. 15/724,126, filed on Oct. 3, 2017, now Pat. No. 10,557,528.

(30) Foreign Application Priority Data

Apr. 13, 2017 (KR) .......................... 10-2017-0048087

(51) Int. Cl.
*F16H 3/72* (2006.01)
*B60K 6/365* (2007.10)
(Continued)

(52) U.S. Cl.
CPC ............. *F16H 3/728* (2013.01); *B60K 6/365* (2013.01); *B60K 6/44* (2013.01); *B60K 6/543* (2013.01);
(Continued)

(58) Field of Classification Search
CPC .......... B60K 6/365; B60K 6/44; B60K 6/543; F16H 3/728; F16H 2200/2007;
(Continued)

(56) References Cited

U.S. PATENT DOCUMENTS 8,905,882 B2    12/2014  Lee et al.
2011/0230291 A1  9/2011  Phillips
(Continued)

FOREIGN PATENT DOCUMENTS

DE    102013111656 A1    5/2014
KR    10-2011-0050894 A   5/2011

OTHER PUBLICATIONS

U.S. Notice of Allowance dated Oct. 28, 2019 issued in U.S. Appl. No. 15/124,126.
(Continued)

*Primary Examiner* — Timothy Hannon
(74) *Attorney, Agent, or Firm* — Morgan, Lewis & Bockius LLP

(57) ABSTRACT

A hybrid vehicle transmission includes input and output shafts, first and second motor/generators, a first planetary gear train in which one rotary element of three rotary elements is connected to the input shaft and another thereof is connected to the first motor/generator, a second planetary gear train in which one of three rotary elements is connected to the output shaft and another thereof is connected to the second motor/generator, a first external gear pair consisting of a first gear, connected to a remaining rotary element of the first planetary gear train, and a second gear, connected to a remaining rotary element of the second planetary gear train, and a second external gear pair consisting of a third gear, connected to the input shaft, and a fourth gear directly connected to one rotary element of the second planetary gear train.

1 Claim, 5 Drawing Sheets

(51) Int. Cl.
*B60K 6/543* (2007.10)
*B60K 6/44* (2007.10)

(52) U.S. Cl.
CPC ... *B60Y 2200/92* (2013.01); *F16H 2200/2007* (2013.01); *F16H 2200/2038* (2013.01); *F16H 2200/2066* (2013.01); *F16H 2200/2082* (2013.01); *Y02T 10/62* (2013.01); *Y10S 903/911* (2013.01); *Y10S 903/918* (2013.01)

(58) Field of Classification Search
CPC ..... F16H 2200/2038; F16H 2200/2066; F16H 2200/2082; B60Y 2200/92; Y02T 10/623; Y02T 10/6243; Y10S 903/911; Y10S 903/918
See application file for complete search history.

(56) References Cited

U.S. PATENT DOCUMENTS

| | | | |
|---|---|---|---|
| 2013/0040775 A1* | 2/2013 | Seo | F16H 3/666 475/218 |
| 2015/0148170 A1* | 5/2015 | Lee | B60K 6/547 475/5 |
| 2016/0046180 A1* | 2/2016 | Hwang | B60K 6/445 475/5 |

OTHER PUBLICATIONS

U.S. Non-Final Office Action dated Jun. 10, 2019 issued in U.S. Appl. No. 15/124,126.

\* cited by examiner

[FIG. 1]
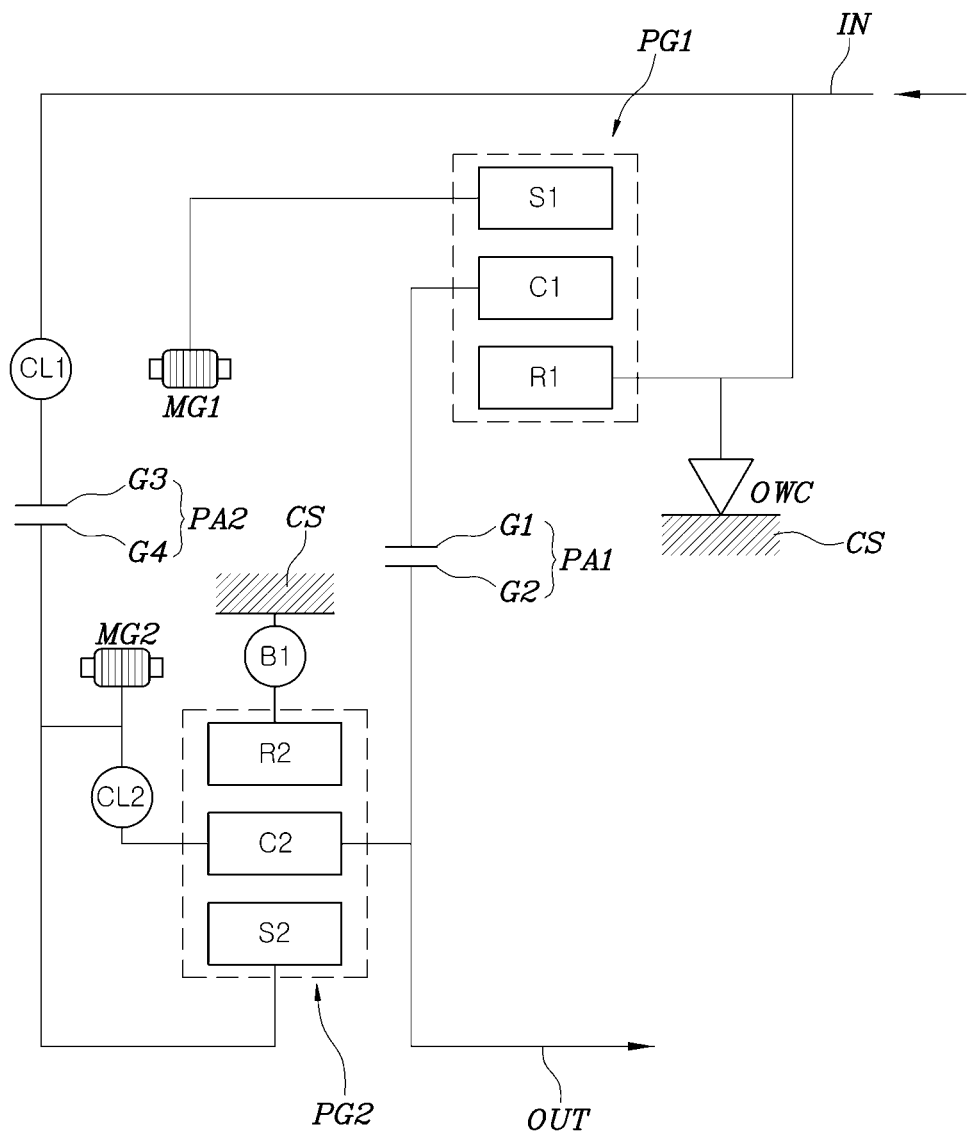

[FIG. 2]
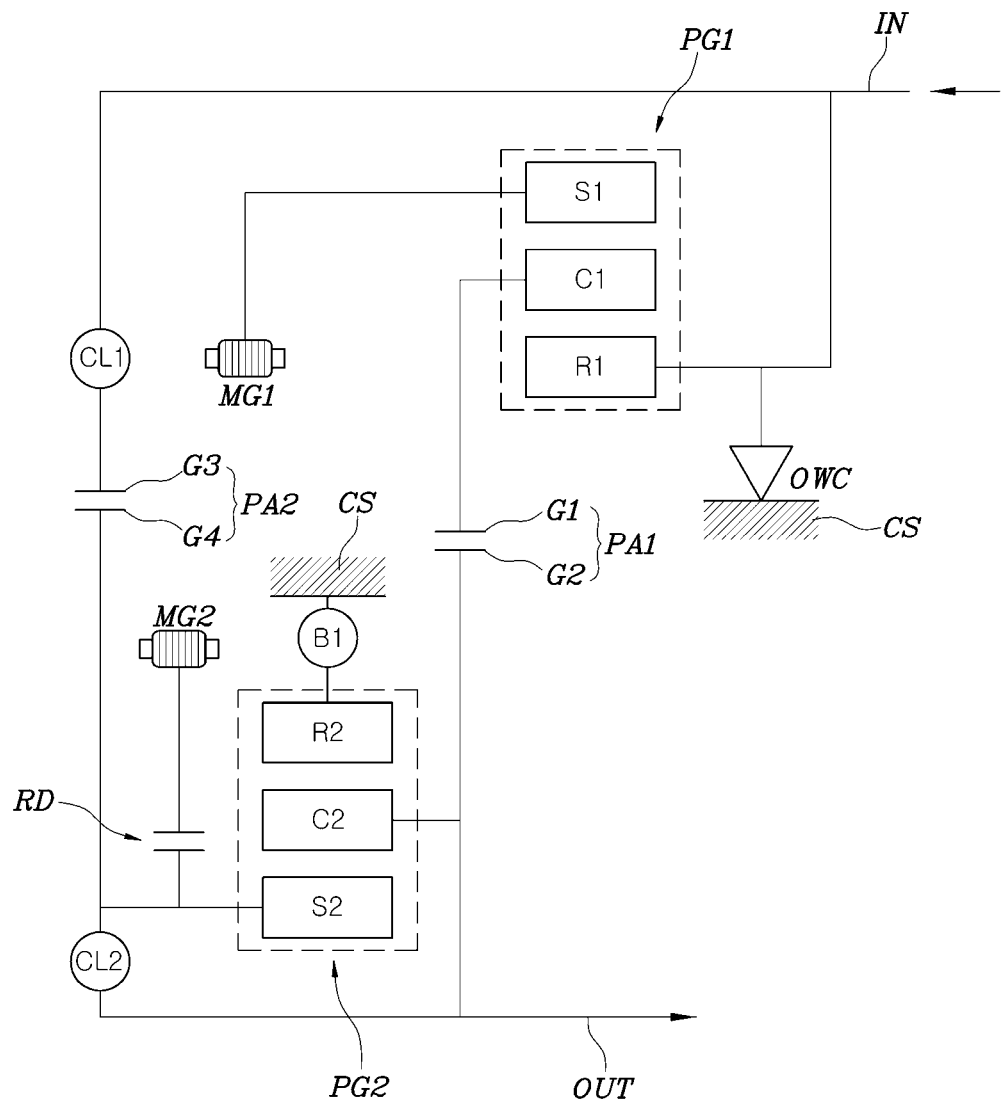

[FIG. 3]
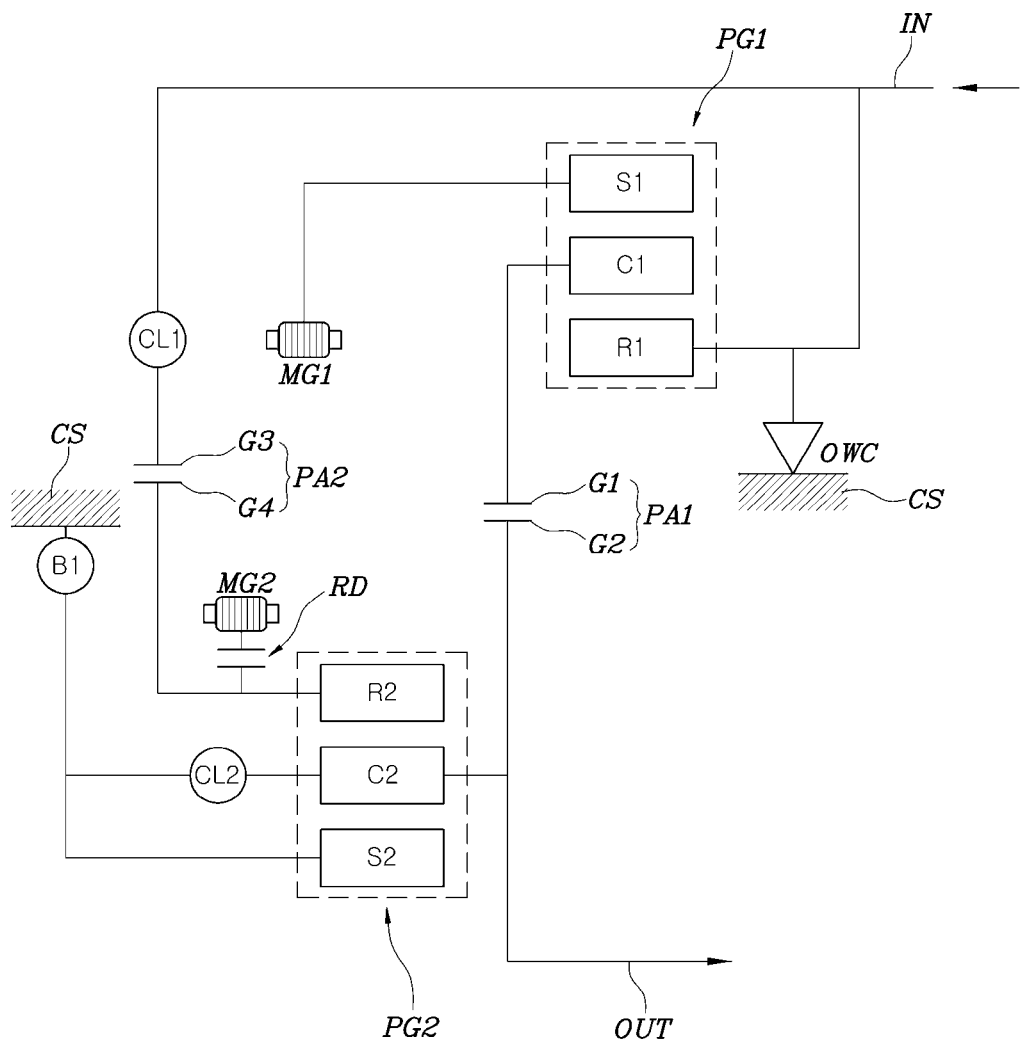

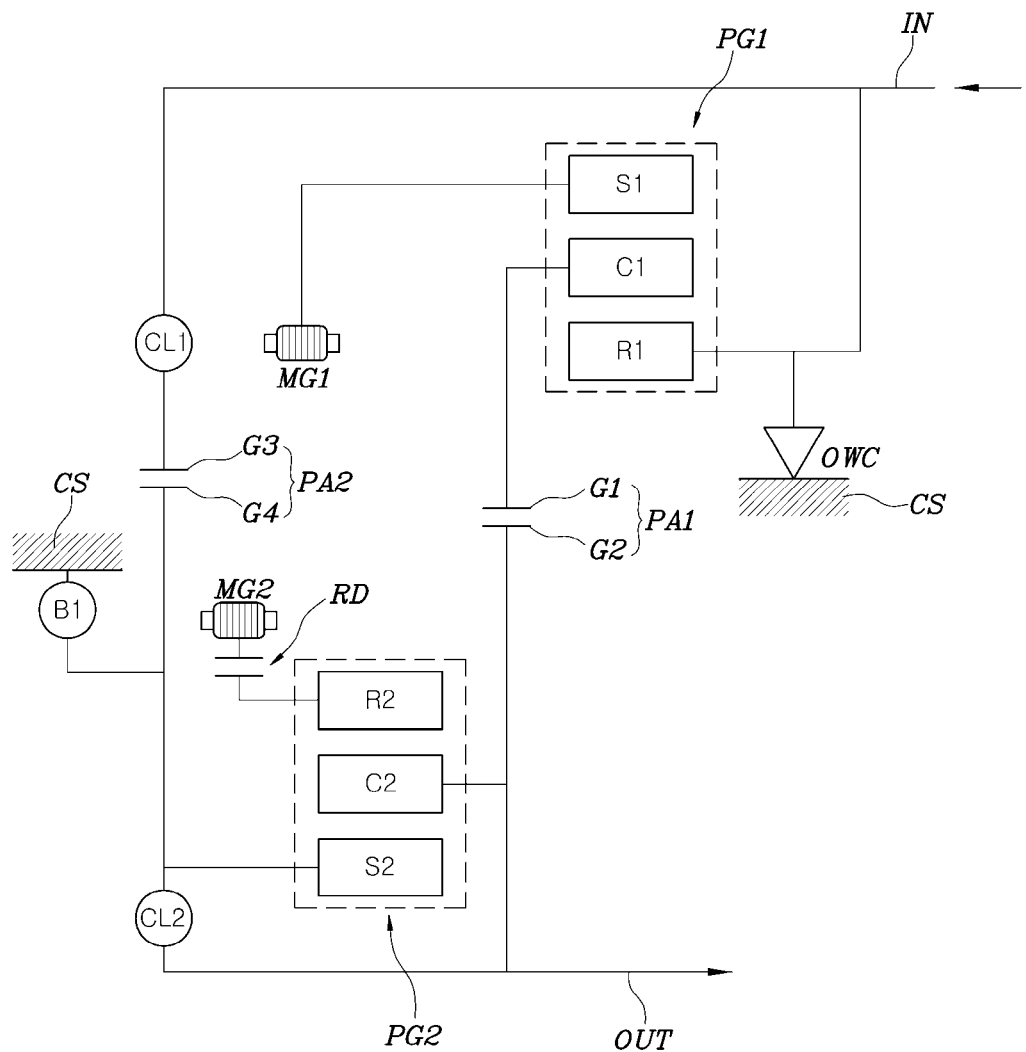
[FIG. 4]

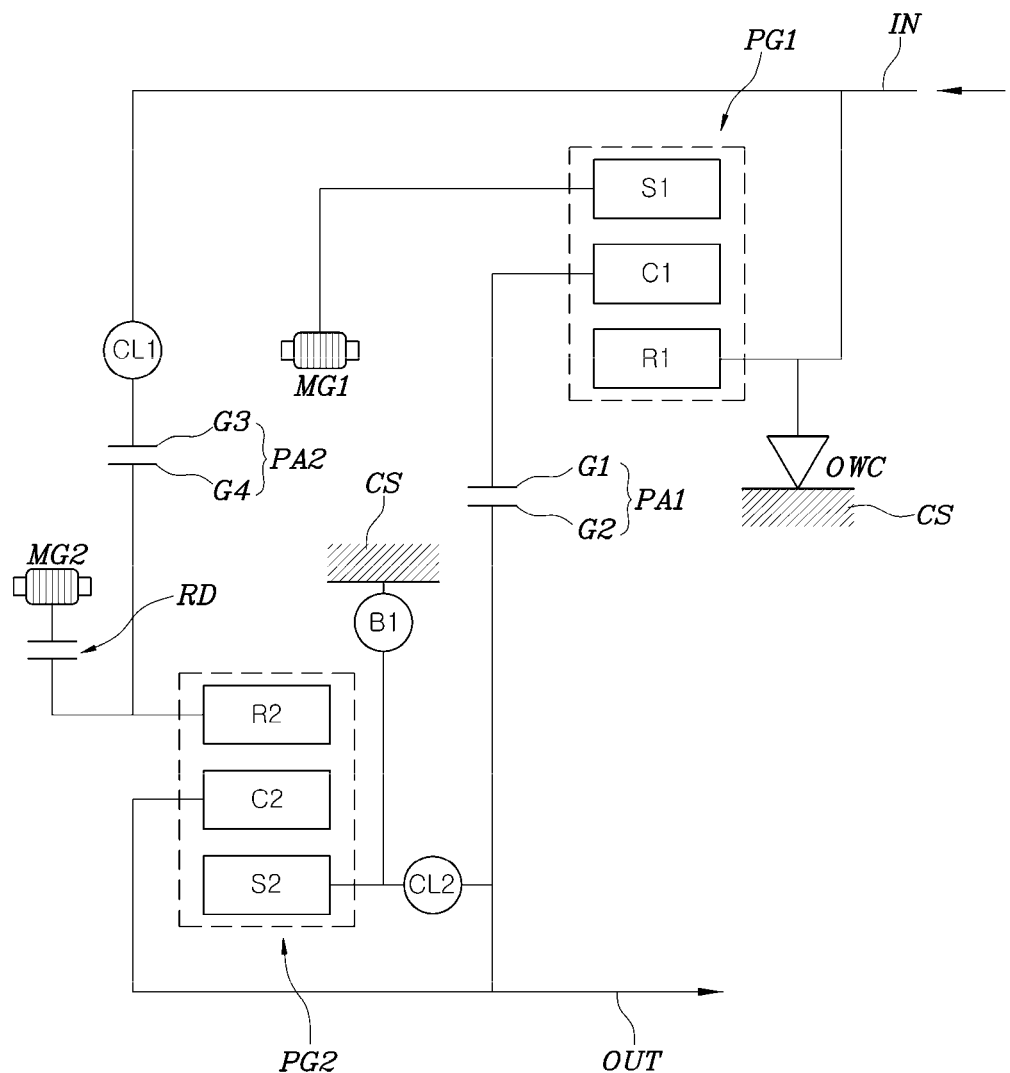
[FIG. 5]

10,900,543 B2

HYBRID VEHICLE TRANSMISSION

CROSS REFERENCE TO RELATED APPLICATION

The present application is a divisional patent application of U.S. patent application Ser. No. 15/724,126 filed on Oct. 3, 2017, based on and claims the benefit of priority to Korean Patent Application No. 10-2017-0048087 filed on Apr. 13, 2017, with the Korean Intellectual Property Office, the entire contents of which are incorporated herein for all purposes by this reference.

TECHNICAL FIELD

The present disclosure relates to a hybrid vehicle transmission, and, more particularly, to a technology of a two-mode Electrically Variable Transmission (EVT) structure using two motor/generators.

BACKGROUND

A hybrid electric vehicle implements operating modes, such as an EV mode in which it is driven only by a motor, an HEV mode in which it simultaneously uses an engine and a motor, and an engine mode in which it uses only an engine, according to the combination of the engine and the motor. It is possible to maximize system efficiency and improve fuel efficiency according to the combination of the operating modes.

An Electrically Variable Transmission (EVT) may be an electric CVT that includes one or more planetary gear trains and two motor/generators to have continuously variable transmission function as in a Continuously Variable Transmission (CVT).

The EVT is controllable such that an engine may be operated at an optimally efficient operating point. Therefore, the EVT has a great advantage of making the most efficient use of engine energy by splitting power input from the engine into a motor/generator as an electric part and an output shaft as a mechanical part through a planetary gear train according to the control of the EVT.

However, a one-mode EVT widely applied in recent years has a disadvantage of increasing vehicle costs since there is a need for a high-capacity motor/generator due to transmission of high power to an electric part at the time of initial starting or in a high-speed section.

To overcome this disadvantage, there is proposed a two-mode EVT structure using two motor/generators.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose a hybrid vehicle transmission in which it is advantageous to improve its mounting to a vehicle by maximizing space utilization therein while implementing a two-mode EVT and to secure a passage for hydraulic supply to used friction elements.

In accordance with an aspect of the present disclosure, a hybrid vehicle transmission includes an output shaft disposed in parallel to an input shaft, first and second motor/generators, a first planetary gear train in which one rotary element of three rotary elements is connected to the input shaft and another thereof is connected to the first motor/generator, a second planetary gear train in which one of three rotary elements is connected to the output shaft and another thereof is connected to the second motor/generator, a first external gear pair consisting of a first gear, connected to a remaining rotary element of the first planetary gear train, and a second gear, connected to a remaining rotary element of the second planetary gear train and externally engaged with the first gear, the first external gear pair being disposed between the first planetary gear train and the second planetary gear train with respect to the axial direction of the input and output shafts, and a second external gear pair consisting of a third gear, connected to the input shaft, and a fourth gear directly connected to one of the rotary elements of the second planetary gear train and externally engaged with the third gear.

The first motor/generator may be positioned between the first external gear pair and the second external gear pair with respect to the axial direction.

The one rotary element, which is connected to the input shaft, of the first planetary gear train may be connected to a transmission case through a one-way clutch that permits only forward rotation.

The second planetary gear train may be positioned between the first external gear pair and the second external gear pair with respect to the axial direction.

The second motor/generator may be positioned between the first external gear pair and the second external gear pair with respect to the axial direction.

The second motor/generator may be connected to one of the three rotary elements of the second planetary gear train through a reduction gear.

The second motor/generator may be positioned outside a space between the first external gear pair and the second external gear pair with respect to the axial direction.

The second motor/generator may be connected to one of the three rotary elements of the second planetary gear train through a reduction gear.

The first planetary gear train may be configured such that a first sun gear is directly connected to the first motor/generator, a first carrier is directly connected to the first gear, and a first ring gear is directly connected to the input shaft, the second gear may be directly connected to a second carrier of the second planetary gear train and the output shaft, the third gear may be connected to the input shaft through a first clutch, and a second clutch may be provided between a second sun gear and the second carrier of the second planetary gear train to directly connect the second sun gear and the second carrier.

The second planetary gear train may be configured such that the second sun gear is directly connected to the fourth gear and a second ring gear is connected to a transmission case through a brake, and the second motor/generator may be directly connected to the second sun gear.

The second planetary gear train may be configured such that the second sun gear is directly connected to the fourth gear and a second ring gear is connected to a transmission case through a brake, and the second motor/generator may be connected to the second sun gear through a reduction gear.

The second planetary gear train may be configured such that the second sun gear is connected to a transmission case through a brake and a second ring gear is directly connected to the fourth gear, and the second motor/generator may be connected to the second ring gear through a reduction gear.

The second planetary gear train may be configured such that the second sun gear is directly connected to the fourth gear and is connected to a transmission case through a brake, and the second motor/generator may be connected to a second ring gear of the second planetary gear train through a reduction gear.

The second planetary gear train may be configured such that the second sun gear is connected to a transmission case through a brake and a second ring gear is directly connected to the fourth gear, and the second motor/generator may be connected to the second ring gear through a reduction gear.

As apparent from the above description, it is advantageous to improve the mounting of the transmission to the vehicle by maximizing space utilization therein while implementing the two-mode EVT and to secure the passage for hydraulic supply to used friction elements.

BRIEF DESCRIPTION OF THE DRAWINGS

The above and other objects, features and advantages of the present disclosure will be more clearly understood from the following detailed description taken in conjunction with the accompanying drawings, in which:

FIG. 1 is a diagram illustrating a hybrid transmission according to a first embodiment of the present disclosure;

FIG. 2 is a diagram illustrating a hybrid transmission according to a second embodiment of the present disclosure;

FIG. 3 is a diagram illustrating a hybrid transmission according to a third embodiment of the present disclosure;

FIG. 4 is a diagram illustrating a hybrid transmission according to a fourth embodiment of the present disclosure; and FIG. 5 is a diagram illustrating a hybrid transmission according to a fifth embodiment of the present disclosure.

DETAILED DESCRIPTION

Referring to FIGS. 1 to 5, a hybrid transmission according to embodiments of the present disclosure commonly includes an output shaft OUT disposed in parallel to an input shaft IN, first and second motor/generators MG1 and MG2, a first planetary gear train PG1 in which one of three rotary elements is connected to the input shaft IN and another thereof is connected to the first motor/generator MG1, a second planetary gear train PG2 in which one of three rotary elements is connected to the output shaft OUT and another thereof is connected to the second motor/generator MG2, a first external gear pair PA1 consisting of a first gear G1, which is connected to a remaining rotary element of the first planetary gear train PG1, and a second gear G2, which is connected to a remaining rotary element of the second planetary gear train PG2 and is externally engaged with the first gear G1, the first external gear pair PA1 being axially disposed between the first planetary gear train PG1 and the second planetary gear train PG2, and a second external gear pair PA3 consisting of a third gear G3, which is connected to the input shaft IN, and a fourth gear G4, which is directly connected to one of the rotary elements of the second planetary gear train PG2 and is externally engaged with the third gear G3.

The rotary element, which is connected to the input shaft IN, of the first planetary gear train PG1 is connected to a transmission case CS through a one-way clutch OWC that permits only forward rotation.

For reference, "axially (axial direction)" means a longitudinal direction of the input shaft IN and the output shaft OUT, "forward (direction)" means a direction of torque input to the input shaft IN for forward driving of a vehicle, and an engine is connected to the input shaft IN.

The first motor/generator MG1 and the second planetary gear train PG2 are axially positioned between the first external gear pair PA1 and the second external gear pair PA2.

In the embodiments illustrated in FIGS. 1 to 4, the second motor/generator MG2 is axially positioned between the first external gear pair PA1 and the second external gear pair PA2.

That is, all of the first motor/generator MG1, the second motor/generator MG2, and the second planetary gear train PG2 are disposed between the first external gear pair PA1 and the second external gear pair PA2, and a space is thus secured between the first planetary gear train PG1 and the output shaft OUT.

Since a differential gear is externally installed to the output shaft OUT in the above secured space, the entire length of the transmission can be reduced and the mounting of the transmission to the vehicle can be improved.

Meanwhile, in the fifth embodiment illustrated in FIG. 5, the second motor/generator MG2 is not disposed between the first external gear pair PA1 and the second external gear pair PA2, but is disposed outside the first external gear pair PA1 and the second external gear pair PA2. However, since a space is also secured between the first planetary gear train PG1 and the output shaft OUT, the mounting of the transmission to the vehicle can be improved.

In all of the first to fifth embodiments, the first planetary gear train PG1 is configured such that a first sun gear S1 is directly connected to the first motor/generator MG1, a first carrier C1 is directly connected to the first gear G1, and a first ring gear R1 is directly connected to the input shaft IN, the second gear G2 is directly connected to a second carrier C2 of the second planetary gear train PG2 and the output shaft OUT, the third gear G3 is connected to the input shaft IN through a first clutch CL1, and a second clutch CL2 is provided between a second sun gear S2 and the second carrier C2 of the second planetary gear train PG2 to directly connect the second sun gear S2 and the second carrier C2.

Meanwhile, the second motor/generator MG2 is directly connected to or is connected through a reduction gear RD to one of the rotary elements of the second planetary gear train PG2. In the first embodiment, the second motor/generator MG2 is directly connected to one of the rotary elements of the second planetary gear train PG2. In the other embodiments, the second motor/generator MG2 is connected through the reduction gear RD to one of the rotary elements of the second planetary gear train PG2.

In the first embodiment illustrated in FIG. 1, the second planetary gear train PG2 is configured such that a second sun gear S2 is directly connected to the fourth gear G4 and a second ring gear R2 is connected to the transmission case CS through a brake B1, and the second motor/generator MG2 is directly connected to the second sun gear S2.

In the second embodiment illustrated in FIG. 2, the second planetary gear train PG2 is configured such that a second sun gear S2 is directly connected to the fourth gear G4 and a second ring gear R2 is connected to the transmission case CS through a brake B1, and the second motor/generator MG2 is connected to the second sun gear S2 through a reduction gear RD.

In the third embodiment illustrated in FIG. 3, the second planetary gear train PG2 is configured such that a second sun gear S2 is connected to the transmission case CS through a brake B1 and a second ring gear R2 is directly connected to the fourth gear G4, and the second motor/generator MG2 is connected to the second ring gear R2 through a reduction gear RD.

In the fourth embodiment illustrated in FIG. 4, the second planetary gear train PG2 is configured such that a second sun gear S2 is directly connected to the fourth gear G4 and is connected to the transmission case CS through a brake B1, and the second motor/generator MG2 is connected to a second ring gear R2 of the second planetary gear train PG2 through a reduction gear RD.

In the fifth embodiment illustrated in FIG. 5, the second planetary gear train PG2 is configured such that a second sun gear S2 is connected to the transmission case CS through a brake B1 and a second ring gear R2 is directly connected to the fourth gear G4, and the second motor/generator MG2 is connected to the second ring gear R2 through a reduction gear RD.

Since the first clutch CL1, the second clutch CL2, and the brake B1 as friction elements are disposed at positions close to the transmission case CS in the embodiments of the present disclosure, it is advantageous to form a passage for fluid supply required to operate them.

In the embodiments of the present disclosure, a first EV mode or a first HEV mode may be implemented to reduce the power of the second motor/generator MG2 by fastening the brake B1 and driving the second motor/generator MG2, and a second EV mode or a second HEV mode may be implemented to output the power of the second motor/generator MG2 at a gear ratio of 1:1 intact by fastening the second clutch CL2 instead of the brake B1.

In the case where a different in gear ratio between the first EV mode and the second EV mode, i.e. a different between a gear ratio in the implementation of the first EV mode of the second planetary gear train PG2 and a gear ratio in the implementation of the second EV mode thereof, is excessively large, it is necessary to increase the capacity of the second clutch CL2 since the second clutch C12 must handle a quantity of heat that is proportional to the different in gear ratio during operation. However, since the increase of the capacity of the second clutch CL2 causes an increase in size, volume, and weight of the transmission and efficiency deterioration, it is necessary to consider reducing the gear ratio in the implementation of the second EV mode of the second planetary gear train PG2 and the difference in gear ratio by decreasing the gear ratio in the implementation of the first EV mode of the second planetary gear train PG2 instead of increasing the capacity of the second clutch CL2.

However, when the difference in gear ratio of the second planetary gear train PG2 is decreased, power performance is poor due to EV oscillation and deterioration of hill-climbing ability by the second motor/generator MG2. Therefore, in the second to fifth embodiments of the present disclosure, the second motor/generator MG2 is connected to the second sun gear S2 or the second ring gear R2 as one rotary element of the second planetary gear train PG2 through the reduction gear RD, thereby preventing the driving force of the vehicle from deteriorating by the second motor/generator MG2.

That is, in the second to fifth embodiments of the present disclosure, it is possible to mount the compact second clutch CL2 in the transmission and sufficiently secure EV oscillation and hill-climbing ability by the second motor/generator MG2 by relatively decreasing the difference in gear ratio of the second planetary gear train PG2 and reducing the quantity of heat handled by the second clutch CL2.

Although the preferred embodiments of the present disclosure have been disclosed for illustrative purposes, those skilled in the art will appreciate that various modifications, additions and substitutions are possible, without departing from the scope and spirit of the invention as disclosed in the accompanying claims.

What is claimed is:

1. A hybrid vehicle transmission comprising:
an output shaft disposed in parallel to an input shaft;
first and second motor/generators;
a first planetary gear train in which a first rotary element of three rotary elements is connected to the input shaft and a second rotary element thereof is connected to the first motor/generator;
a second planetary gear train in which a first rotary element of three rotary elements is connected to the output shaft and a second rotary element thereof is connected to the second motor/generator;
a first external gear pair consisting of a first gear, connected to a third rotary element of the first planetary gear train, and a second gear, connected to the first rotary element of the second planetary gear train and externally engaged with the first gear, the first external gear pair being disposed between the first planetary gear train and the second planetary gear train with respect to an axial direction of the input and output shafts; and
a second external gear pair consisting of a third gear, selectively connected to the input shaft, and a fourth gear directly connected to one of the three rotary elements of the second planetary gear train and externally engaged with the third gear,
wherein the first motor/generator is positioned between the first external gear pair and the second external gear pair with respect to the axial direction,
the second planetary gear train is positioned between the first external gear pair and the second external gear pair with respect to the axial direction,
the first, second, and third rotary elements of the first planetary gear train are a first ring gear, a first sun gear, and a first carrier, respectively,
the first and second rotary elements of the second planetary gear train are a second carrier and a second sun gear, respectively,
the first planetary gear train is configured such that the first sun gear is directly connected to the first motor/generator, the first carrier is directly connected to the first gear, and the first ring gear is directly connected to the input shaft,
the second gear is directly connected to the second carrier of the second planetary gear train and the output shaft,
the third gear is connected to the input shaft through a first clutch,
a second clutch is provided between the second sun gear and the second carrier of the second planetary gear train to directly connect the second sun gear and the second carrier,
the second motor/generator is positioned outside a space between the first external gear pair and the second external gear pair with respect to the axial direction,
the second planetary gear train is configured such that the second sun gear is connected to a transmission case through a brake and a second ring gear is directly connected to the fourth gear, and
the second motor/generator is connected to the second ring gear through a reduction gear.

* * * * *